United States Patent
Rank

Patent Number: 5,421,101
Date of Patent: Jun. 6, 1995

[54] DEDICATED CRIMP MEASURING GAUGE

[75] Inventor: James S. Rank, Lincoln Park, Mich.

[73] Assignee: UT Automotive, Inc., Dearborn, Mich.

[21] Appl. No.: 227,810

[22] Filed: Apr. 14, 1994

[51] Int. Cl.⁶ .......................... G01B 3/18; G01B 5/02
[52] U.S. Cl. ........................................ 33/831; 33/813; 33/784
[58] Field of Search ................. 33/831, 813, 826, 783, 33/784, 792, 794

[56] References Cited

U.S. PATENT DOCUMENTS

| | | | |
|---|---|---|---|
| 570,189 | 10/1896 | Stromberg | 33/831 |
| 1,405,285 | 1/1922 | Church | 33/831 |
| 2,952,917 | 9/1960 | Germann | 33/831 |
| 5,253,431 | 10/1993 | Smith | 33/784 |

FOREIGN PATENT DOCUMENTS 258194  9/1926  United Kingdom ................. 33/831

*Primary Examiner*—Christopher W. Fulton
*Attorney, Agent, or Firm*—Laura M. Slenzak

[57] ABSTRACT

The measurement tool of the present invention includes a movable spindle and an anvil between which the object to be measured is placed. The anvil is formed to have opposing sloping edges leading to an anvil measurement apex, and the spindle is formed to have first and second measurement sites, where the first measurement site includes a conical portion of the spindle having a spindle measurement apex, and where the second measurement site includes a block portion of the spindle having a generally flat surface aligned generally tangential to the anvil measurement apex.

1 Claim, 2 Drawing Sheets

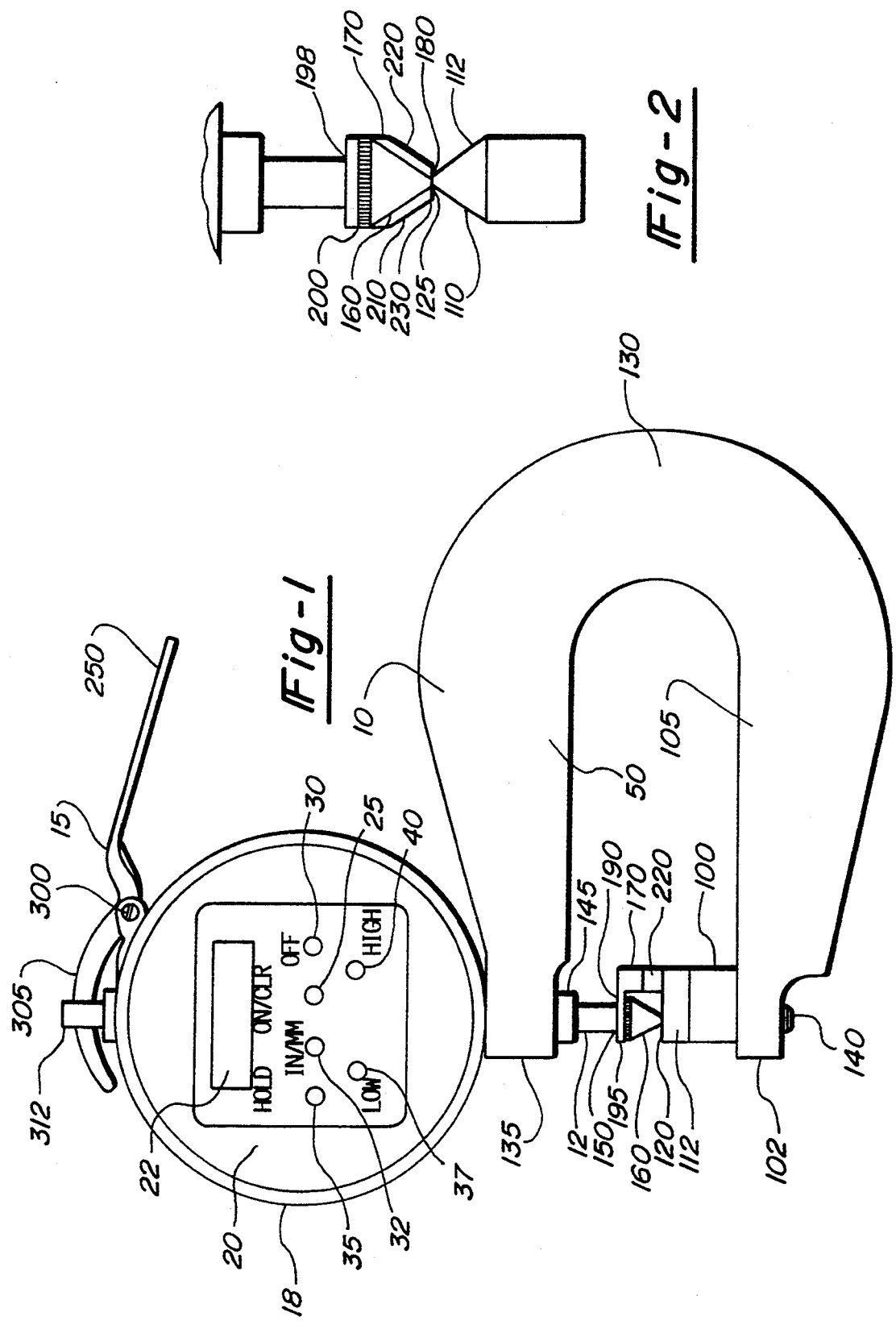

DEDICATED CRIMP MEASURING GAUGE

BACKGROUND OF THE INVENTION

1. Technical Field

The present invention relates generally to tools for measuring, and more particularly to a hand-held micrometer for measuring wire crimp size.

2. Discussion of the Related Art

In the field of wire harness and connector assembly, wires are often attached to terminals by crimping. When crimping wires, the wire is inserted into a deformable sleeve, usually metallic, which is attached to the terminal. The sleeve is then deformed by a tool such as a press or clamp to sandwich the wire within the sleeve. A number of measurable factors related to the crimp can be measured to determine the integrity of the crimp. A poorly formed crimp is undesirable for several reasons. The poorly formed crimp may not sandwich the wire tightly enough to prevent it from loosening out of the sleeve. Or, a crimp that sandwiches the wire too tightly may actual severe some or all of the strands that make up the wire. Either of these types of poorly formed crimps result in poor electrical continuity between the wire and the terminal. A poorly formed crimp may also result from the insulation that surrounds the wire being accidentally sandwiched inside the sleeve along with the wire. Generally, the insulation is stripped back to expose a section of bare wire, and that bare section is what is sandwiched in the sleeve for the crimp connection. If insulation becomes sandwiched in the crimp, there may be poor electrical continuity between the wire and the terminal.

In order to reduce the likelihood that wires and terminals with poorly formed crimps are shipped from the factory, it has been determined that a satisfactory crimp has certain dimensional characteristics, like having a certain height and a certain width. Therefore, it is necessary for the factory worker to perform measurements on the finished product to ensure it meets specifications for wire crimp height and crimp width. Currently, most measurements must be accomplished at a separate measurement fixture, which is not located in the same place as the assembly fixtures. This causes the factory worker to have to leave her work station to perform these measurements on the finished product. This reduces manufacturing efficiency. Also, many of the tools currently used are susceptible to measurement variations introduced by the worker. For example, workers commonly use manual calipers to measure crimp height and width. Variations in crimp height and width measurements can be caused by changes in the position of the crimp with respect to the calipers, changes in pressure applied to the caliper by the worker, and variances within the measuring tools themselves. It would therefore be desirable to provide a measurement tool that could be used by the worker at the assembly station rather than at a separate measurement station. It would also be desirable to provide a measurement tool which is less susceptible to measurement variations caused by crimp position within the tool, pressure applied by the worker to the measurement tool during the measurement process, and variations within the measurement tools themselves.

SUMMARY OF THE INVENTION

It is therefore an object of the present invention to provide a measurement tool suitable for use at the assembly station rather than at a separate measurement station. The measurement tool of the present invention includes a movable spindle and an anvil between which the object to be measured is placed. The anvil is formed to have opposing sloping edges leading to an anvil measurement apex, and the spindle is formed to have first and second measurement sites, where the first measurement site includes a conical portion of the spindle having a spindle measurement apex, and where the second measurement site includes a block portion of the spindle having a generally flat surface aligned generally tangential to the anvil measurement apex. Wire crimp width measurements can be taken by placing the crimp at the first measurement site between the anvil measurement apex and the spindle measurement apex. Wire crimp height measurements can be taken by placing the crimp at the second measurement site between the anvil measurement apex and the flat surface. One feature of the present invention is that the measurement tool is sized such that it is suitable to be held in the hand of the factory worker, allowing the worker to have the tool with her at the assembly station. Another feature of the present invention is that the moveable spindle has both first and second measurement sites for performing both types of crimp measurements. One advantage of the present invention is that having first and second measurement sites on the same tool reduces tool to tool variation in measurements when measuring a single crimp for crimp height and crimp width.

BRIEF DESCRIPTION OF THE DRAWINGS

Other objects, features and advantages of the present invention can be better understood by referencing the following discussion of the presently preferred embodiment in conjunction with the drawings in which:

FIG. 1 is a front plan view showing the measurement tool in its rest position;

FIG. 2 is a detail side plan view showing the relationship between the spindle and anvil;

DESCRIPTION OF THE PRESENTLY PREFERRED EMBODIMENT

Figure 4:
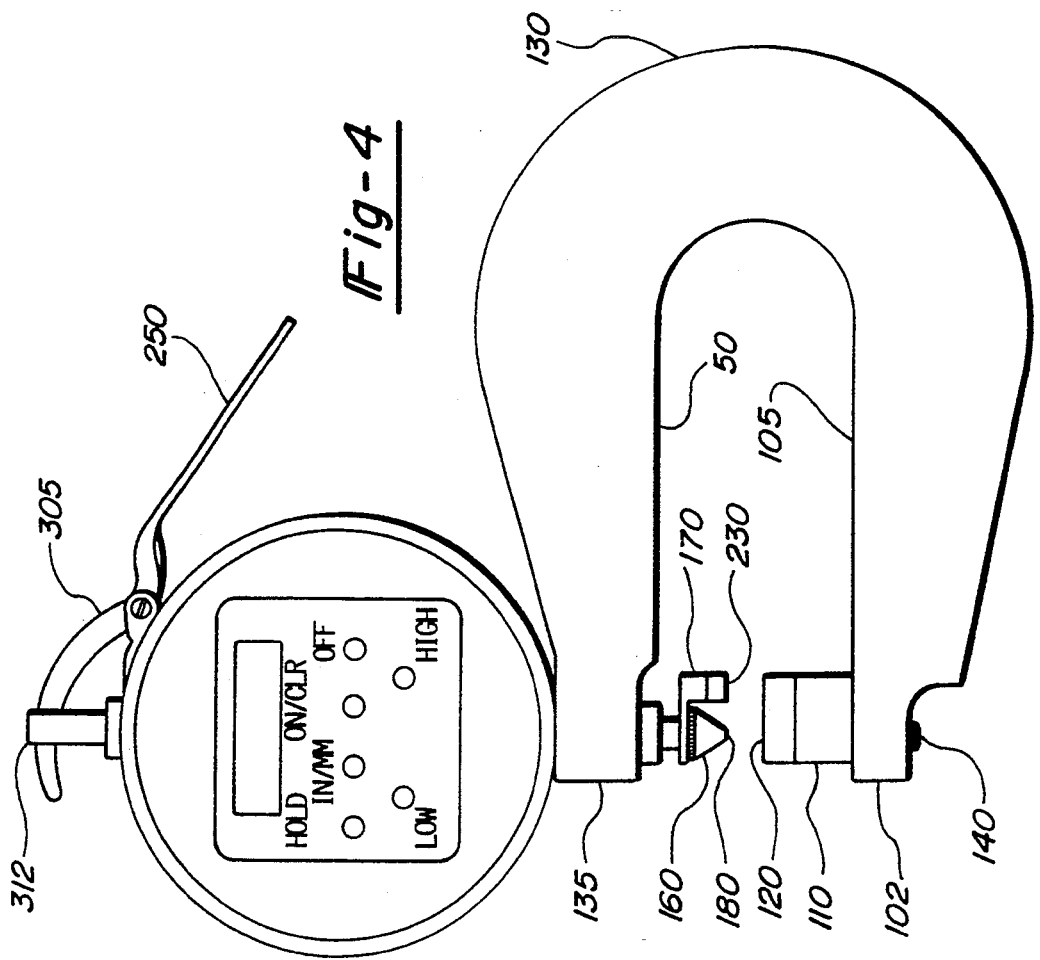
FIG. 4 is a front plan view showing the measurement tool with the spindle partially raised such as for measuring an object.

As shown in FIG. 1, the measurement tool generally includes a C-shaped body 10, a spindle 12, a spindle lift handle 15 and a spindle travel measurement gauge 18. Here, the spindle 12 passes through the body of the spindle travel measurement gauge 18, and the travel of the spindle 12 with respect to a reference position is measured in thousands of inches, or microns. The spindle travel measurement gauge is a DPX-1000 indicator, commercially available from Chicago Dial, located in Chicago, Ill. The gauge 18 has a face plate 20 with a measurement display 22 and measurement selection buttons 25-45. The gauge 18 is approximately 2¾"in diameter, with the display 22 being approximately 1" wide and ¼ tall. The display is an LCD digital readout. The face plate 20 of the gauge can rotate to allow the orientation of the display 18 with respect to the measurement tool body 10 to vary to suit the worker. Here, it is presumed that worker will be grasping the tool in her right hand, with her thumb on the spindle lift handle 15 and the body 10 resting in her palm and grasped by fingers around the upper leg 50 of the C-shaped body.

When held in this manner, having the display 22 oriented as shown allows the worker to view the display comfortably. However, if the worker would rather the display be rotated clockwise or counterclockwise to suit the manner in which she holds the tool, the face plate 20 can be rotated to accommodate a different viewing orientation for the display 22. The gauge measurement selection buttons 25–45, as provided by the manufacturer, include a combination power on and display clear button 25, a power off button 30, a button for selecting english or metric (i.e. microns or millimeters) as the measurement display mode 32, a measurement hold button 35, a low datum reference selection mode button 37 and a high datum reference selection mode button 40. Such features are common on digital indicators such as this, and need not be explained in detail to understand this invention.

Referring still to FIG. 1, and as shown in greater detail in FIG. 2, the measurement tool has an anvil 100 located at the outermost end 102 of the lower leg 105 of the body 10, oriented so that the anvil 100 faces toward the inside of the "C" of the body 10. The anvil 100 is approximately ½" tall, ½" wide and ¼" thick, and has opposing sloped edges 110, 112 that taper toward the anvil measurement apex 120. The anvil apex 120 has a very small flat surface 125, less than 1/32" wide. The anvil apex 120 has this small flat surface 125 to prevent the anvil apex 120 from acting as a cutting edge. Recalling that this tool is preferably used for measuring wire crimps, having a sharp anvil apex may risk damaging the wire during the measurement operation. However, there are advantages to having a pointed anvil apex, because this reduces the likelihood that the orientation of the crimp with respect to the anvil will cause measurement variations. The anvil 100 is machined from stainless steel, and has a clean brushed finish. Stainless steel is used because of its corrosion resistant characteristics. Since this tool is designed to be used in the factory by a factory worker, it is important that the tool be resistant to rust or other forms of oxidation, which may corrupt the measurement process.

The upper 50 and lower 105 legs of the body 10 are approximately 4" long, with the legs 50, 105 being separated by an approximately 1¼" gap formed by the "C". The body 10 is anodized hollow tool form steel, which is strong yet lightweight. The legs 50, 105 are approximately 1" thick at the base 130 of the "C", and taper to about ½" thick at either end 102, 135. The anvil 100 is attached to the end 102 of the lower leg 105 by a screw 140, which taps through the end 102 into the body of the anvil 100. The spindle 12 passes through the end 135 of the upper leg 50, and travels freely within a bushing 145 press fit into the end 135. The spindle 12 is formed from stainless steel, and is approximately 3/16" diameter and 4" long. At the measurement end 150 of the spindle are located two measurement sites: a conical apex 160 and a block 170. When at rest, the conical apex 160 and block 170 rest flush against the anvil apex 120. The conical apex 160, like that of the anvil apex 120, has a small flat 180 so that the conical apex does not accidentally pierce the object being measured.

The spindle 12, conical apex 160 and block 170 are attached to each other in a sandwich fashion. That is, the spindle 12 is a smaller diameter at the measurement end 150. The block 170 has an attachment flange 190 extending perpendicular to the axis of the spindle 12. The attachment flange 190 has a hole drilled through its end 195 which allows the reduced diameter portion of the spindle 12 to pass through and seat against the main portion of the spindle 12, which acts as a collar 198. The conical apex 160 is then attached to the spindle 12 to sandwich the block flange 190 between the conical apex 160 and the collar 198. One of ordinary skill can appreciate that the conical apex 160 may be attached to the spindle in a number of ways, such as being press fit onto the end of the spindle 12, or threaded onto the end of the spindle. What manner of attaching the conical apex 160 to the spindle 12 is used, it must simply serve to ensure the conical apex 160 and block 170 remain fixed in position at the measurement end 150 of the spindle 12.

Referring still to FIGS. 1 and 2, it can be seen that the conical apex is approximately ¼" from base to apex, and is approximately ¼" in diameter. In this embodiment, the conical apex 160 is attached to the measurement end 150 of the spindle 12 by threading the apex onto the spindle. Therefore, a knurled collar 200 encompasses the base of the conical apex 160, and can be grasped by a wrench or similar tool for tightening the conical apex 160 onto the spindle 12. The block 170 is approximately ⅜" tall, 3/16" wide and ¼" thick, and has small tapers 210, 220 that lead to the flat measurement surface 230. The flat measurement surface 230 is tangential to the plane of the flat 125 on the anvil apex 120, and lies in the same plane as the small flat 180 on the conical apex 160. In this way, the conical apex 160 and block 170 rest flush against the anvil apex 120 when the tool is at rest.

Figure 3:
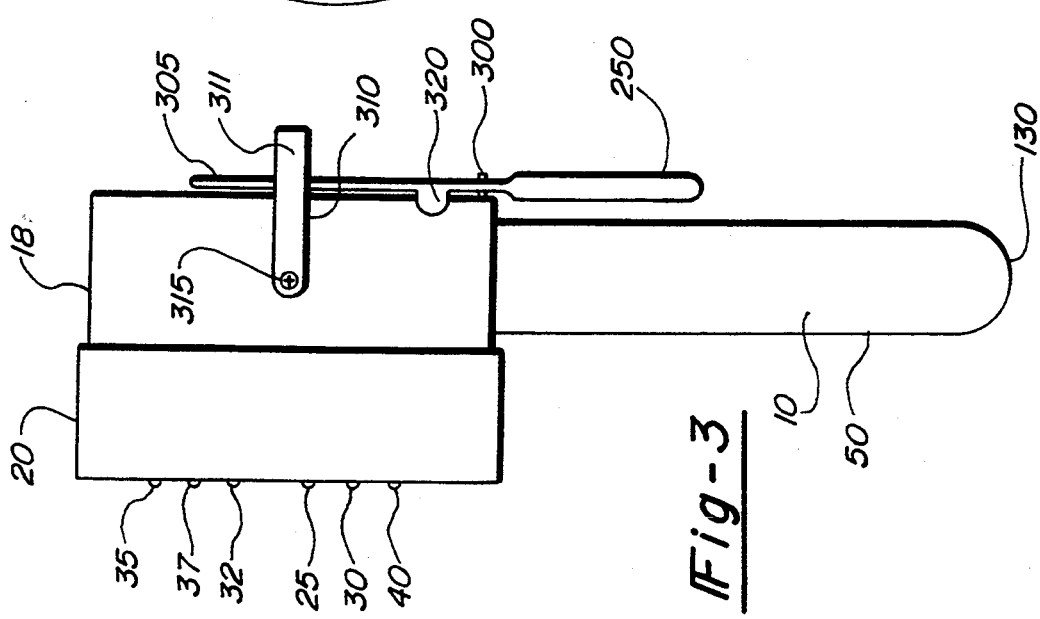
FIG. 3 is a top plan view showing the relationship between the lift handle and the spindle.

As shown in FIGS. 1, 3, and 4, the spindle 12 is raised by the spindle lift handle 15 to allow a work piece to be measured. The work piece is placed between the anvil apex 120 and either the conical apex 160 or block 170 when the spindle 12 is retracted by the lift handle 15. The spindle 12 is spring-loaded within the DPX-1000 gauge 18, causing it to be urged back toward its rest position when the lift handle 15 is relaxed. Therefore, the worker need only apply downward pressure on the thumb lever 250, which is translated through the lift handle fulcrum 300 as an upward force on the lift leg 305. The lift leg 305 rests underneath the spindle lift flange 310. As the thumb lever 250 is lowered and the lift leg 305 raises, the spindle lift flange 310 is translated upward, causing the spindle 12 to travel through the gauge 18. The internal mechanism of the gauge measures the linear travel of the spindle within the gauge, which is directly proportional to the distance between the anvil apex 120 and the conical apex 160 and block 170. Here, the spindle flange 310 is a ½" by ⅛" tab 311 of metal, which is attached to the end 312 of the spindle 15 by a screw 315. The lift handle 15 has an overtravel stop 320 to prevent the lift leg 305 from rotating too far away from the spindle lift flange 310.

In use, the worker grasps the measurement tool in her hand by placing her thumb on the thumb lever 250 of the lift handle 15, and by resting the base 130 and upper leg 50 of the C-shaped body 10 between her palm and fingers of her right hand. To measure a work piece, she simply lowers her thumb to raise the lift leg 305 and retract the spindle 15 from the anvil 100. If she wishes to measure crimp width, she holds the crimped work piece so that the crimp rests between the anvil apex 120 and the block 170, and relaxes her thumb pressure on the thumb lever 250. The internal spring loading on the spindle 15 within the gauge 18 causes the spindle to rest against the work piece. The display 22 shows the width of the crimp as measured in microns. To then measure the same work piece for crimp height, the worker retracts the spindle 15 to allow the work piece to be moved over to rest between the anvil apex 120 and the conical apex 160. Relaxing the thumb lever 250 allows the spring loaded spindle 15 to rest against the work piece, and the crimp height is shown in the display 22 in microns.

It should be appreciated that there are several advantages to having both the conical apex 160 and block 170 at the end of the spindle 15 for measuring different features. For measuring crimp height, it is preferable to use a point rather than a flat because of the variations that may be introduced into the measurement due to anvil flash. However, the larger flat measurement surface afforded by the block allows the worker to measure dimensions, such as crimp width, which are not unduly influenced by variations such as anvil flash. Also, having both the conical apex 160 and block 170 attached to the same spindle 15 and aligned to both rest flush against the measurement anvil apex 120 eliminates measurement variations between crimp width and crimp height that may otherwise exist because separate measurement tools would be needed.

It can be appreciated that there may be other manners of expressing the present invention that are not specifically enumerated in this description. Rather, the foregoing description of the presently preferred embodiment was provided for the purposes of illustration, and should not be construed to limit the invention. One of ordinary skill in the art can appreciate that a variety of modifications not described herein may be effected to the invention without departing from the spirit or scope of this invention.

I claim:

1. An apparatus for measuring an object, said measuring apparatus comprising:

a measurement anvil having a measurement apex, said measurement apex lying in a measurement apex plane;

a measurement cone opposing said measurement anvil, said measurement cone having a conical apex, said conical apex lying in a conical apex plane; and a measurement block opposing said measurement anvil, said measurement block having a substantially flat surface lying in a measurement block plane, said measurement block plane being generally tangential to said measurement apex plane and lying substantially parallel to said conical apex plane, wherein said object is measured in one manner by placing it between said anvil apex and said conical apex, and wherein said object is measured in another manner by placing it between said anvil apex and said flat surface, said measurement cone and said measurement block being mechanically connected to each other so as to move in unison.

* * * * *